United States Patent
Young

(10) Patent No.: US 6,823,751 B1
(45) Date of Patent: Nov. 30, 2004

(54) SPHERE OR PIG DETECTION SWITCH ASSEMBLY

(75) Inventor: William Bradley Young, Maize, KS (US)

(73) Assignee: Meter Engineers, Inc., Maize, KS (US)

( * ) Notice: Subject to any disclaimer, the term of this patent is extended or adjusted under 35 U.S.C. 154(b) by 283 days.

(21) Appl. No.: 10/154,491

(22) Filed: May 22, 2002

(51) Int. Cl.⁷ ............................................. G01F 25/00
(52) U.S. Cl. ..................................... 73/865.8; 73/1.18
(58) Field of Search ............... 73/865.8, 1.15, 73/1.18, 1.24; 116/281, 204

(56) References Cited

U.S. PATENT DOCUMENTS

| | | | | |
|---|---|---|---|---|
| 3,306,251 A | * | 2/1967 | Suttie | 116/215 |
| 3,478,717 A | * | 11/1969 | Kidd | 116/204 |
| 4,079,619 A | * | 3/1978 | Dobesh | 73/1.01 |
| 4,491,018 A | * | 1/1985 | Stringer et al. | 73/865.8 |
| 4,658,646 A | * | 4/1987 | Bell et al. | 73/865.8 |
| 5,263,220 A | * | 11/1993 | Campbell | 15/104.063 |
| 5,279,251 A | * | 1/1994 | Bierman | 116/204 |
| 6,357,384 B1 | * | 3/2002 | Laymon et al. | 116/281 |

* cited by examiner

Primary Examiner—Robert Raevis
(74) Attorney, Agent, or Firm—Stinson Morrison Hecker LLP

(57) ABSTRACT

A sphere or pig detection switch assembly adapted for being mounted on a pipe through which the sphere or pig will run. The assembly includes an elongated, hollow main body portion presenting an elongated chamber therein. The body portion defines a detection zone positioned alongside the chamber and includes mounting structure for a detection element including a detection surface to be mounted adjacent said zone. The assembly also includes an elongated probe shaft disposed mainly within the chamber. The probe shaft includes a centrally disposed activation portion and is longitudinally moveable within the chamber from a first position with the activation portion spaced from the zone to a second position with the activation portion at the zone. The probe shaft includes an inner length having an inner terminal end that normally protrudes into a pipe upon which the detection switch assembly is mounted and the same is configured, arranged and positioned so that it will be contacted and pushed toward the chamber by a pig or sphere running along the pipe.

13 Claims, 5 Drawing Sheets

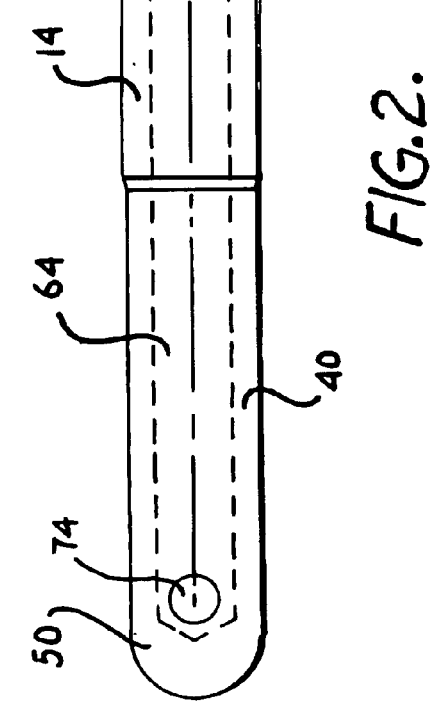

SPHERE OR PIG DETECTION SWITCH ASSEMBLY

BACKGROUND OF THE INVENTION

1. Field of the Invention

The invention relates to the field of sphere or pig detection devices used to measure flow and other conditions in a pipe. In particular, the invention relates to an improved sphere detection switch assembly which operates in conjunction with spheres running along a pipe to accurately measure the flow rate of fluids moving through the pipe. The invention also relates to an improved switch assembly which may be used to detect the position of inspection and/or maintenance pigs running along a pipe.

2. The Prior Art Background

Sphere detection switches are well known for accurately measuring flow in pipeline installations. These devices are typically valuable to facilitate the measurement of the time it takes for a sphere running along the inside of a pipe to travel between two spaced sphere detection switches. The volume between the detection switches is known, and therefore the volumetric flow rate may be determined simply by measuring the time interval between the time the sphere passes the first switch and the time the sphere passes the second. Known switches typically measure such time interval using a probe shaft having an end which protrudes into the pipe. As the sphere moves along the pipe, it encounters the end of the probe shaft and the outer surface of the sphere acts as a camming surface to push the end of the shaft out of its path in the pipe. This movement translates into longitudinal movement of the entire probe shaft. The probe shaft is equipped with a centrally disposed activation portion, usually in the form of an annular collar extending around the probe shaft. When the shaft moves longitudinally, this activation portion is moved into a detection zone where its presence is detected by a detection surface of a detection element. Typically, the presence of the activation portion in the zone is detected because it disrupts a magnetic field established in the zone by the element. The disruption of the magnetic field results in the generation of an electrical signal which is utilized by a timing mechanism to determine the precise time interval between switches.

Similar devices have been used to detect the position of maintenance and/or inspection pigs.

One of the shortcomings of prior art detection switches in this field results from the buildup of debris, and in particular metallic debris, on the detection surface of the detection element. Suffice it to say that the buildup of debris on the detection surface may interfere with the magnetic field and thereby the accuracy of the timing and/or detection procedure. Another shortcoming is that prior art switch devices have universally employed metallic bearing surfaces to support and guide the longitudinal movement of the probe shaft. This metal-to-metal contact creates additional friction that interferes with the movement of the probe shaft to thereby disturb the accuracy of the generated signal and often results in the generation of metallic debris which is then free to accumulate on the detection surface.

SUMMARY OF THE INVENTION

The shortcomings present in prior art devices as described above are alleviated, if not completely eliminated, by the present invention which provides a sphere or pig detection switch assembly adapted for being mounted on a pipe through which a sphere or pig will run. The detection switch assembly may desirably include an elongated, hollow main body portion presenting an elongated chamber therein. The body portion also defines a detection zone positioned alongside the chamber and generally will include mounting structure for a detection element that includes a detection surface to facilitate the mounting of the element with the detection surface thereof adjacent the detection zone for the purpose of providing a magnetic field in the zone.

The detection switch assembly of the invention also may include an elongated probe shaft disposed mainly within the chamber. The probe shaft may be equipped with a centrally disposed activation portion and the same may desirably be mounted for longitudinal movement within the chamber from a first position with said activation portion spaced from the detection zone to a second position with said activation portion at said detection zone. The probe shaft also may have an inner terminal end that protrudes into a pipe upon which the detection switch assembly is mounted when the probe shaft is in its first position. This inner terminal end may be configured, arranged and positioned so that it will be contacted and pushed toward said chamber by a pig or sphere running along a pipe upon which the switch assembly is mounted, whereby to cause the probe shaft to move from its first position to its second position.

In accordance with the principles and concepts of the invention, the detection switch assembly of the invention also may include a wiper element carried by the probe shaft in a position to wipe debris from a detection surface positioned adjacent said zone as the probe shaft moves from its first position to its second position under the influence of contact between a pig or sphere and said inner terminal end of the probe shaft.

In another form of the invention, the same provides a similar sphere or pig detection switch assembly that includes a pair of non-metallic, rigid guide bushings for the probe shaft. One of these guide bushings is disposed in generally surrounding relationship to an inner length of the probe shaft and another one of the guide bushings is disposed in generally surrounding relationship to an outer length of the probe shaft. These bushings are adapted and arranged to support and guide the probe shaft as it moves longitudinally from its first position to its second position so that metal to metal contact is avoided during such movement.

In yet another form of the invention, the detection switch assembly may include the non-metallic, rigid guide bushings as well as the wiper element described above.

Desirably, in accordance with the preferred embodiments of the invention, the chamber of the main body may be cylindrical and the activation portion may be annular. In addition, the wiper element may be annular, disposed so as to surround the outer length of the probe shaft and located in contact with a shoulder on the activation portion of the probe shaft.

In addition, the detection surface may desirably be flat and the wiper element has an outer peripheral edge which is located at a distance of from about 0.0001 to about 0.005 inch from said detection surface.

Furthermore, the bushings may each include an inner circular hole and the inner and outer lengths of the probe shaft may be circular in transverse cross-sectional configuration. Ideally, the bushings may be made of a hard, frictionless plastic material.

In accordance with the invention, the outer peripheral edge of wiper element and the detection surface may desirably be configured such that any debris which may be present on the surface in sufficient quantity to interfere with the detection of the presence of the activation portion at the detection zone is wiped from the detection surface when the peripheral edge passes the detection surface during movement of the probe shaft from said first position to said second position.

BRIEF DESCRIPTION OF THE DRAWINGS

FIGS. 2 and 3 respectively are side elevational and right hand end views of the probe shaft of the switch assembly of FIG. 1;

DETAILED DESCRIPTION OF THE PREFERRED EMBODIMENTS

Figure 1:
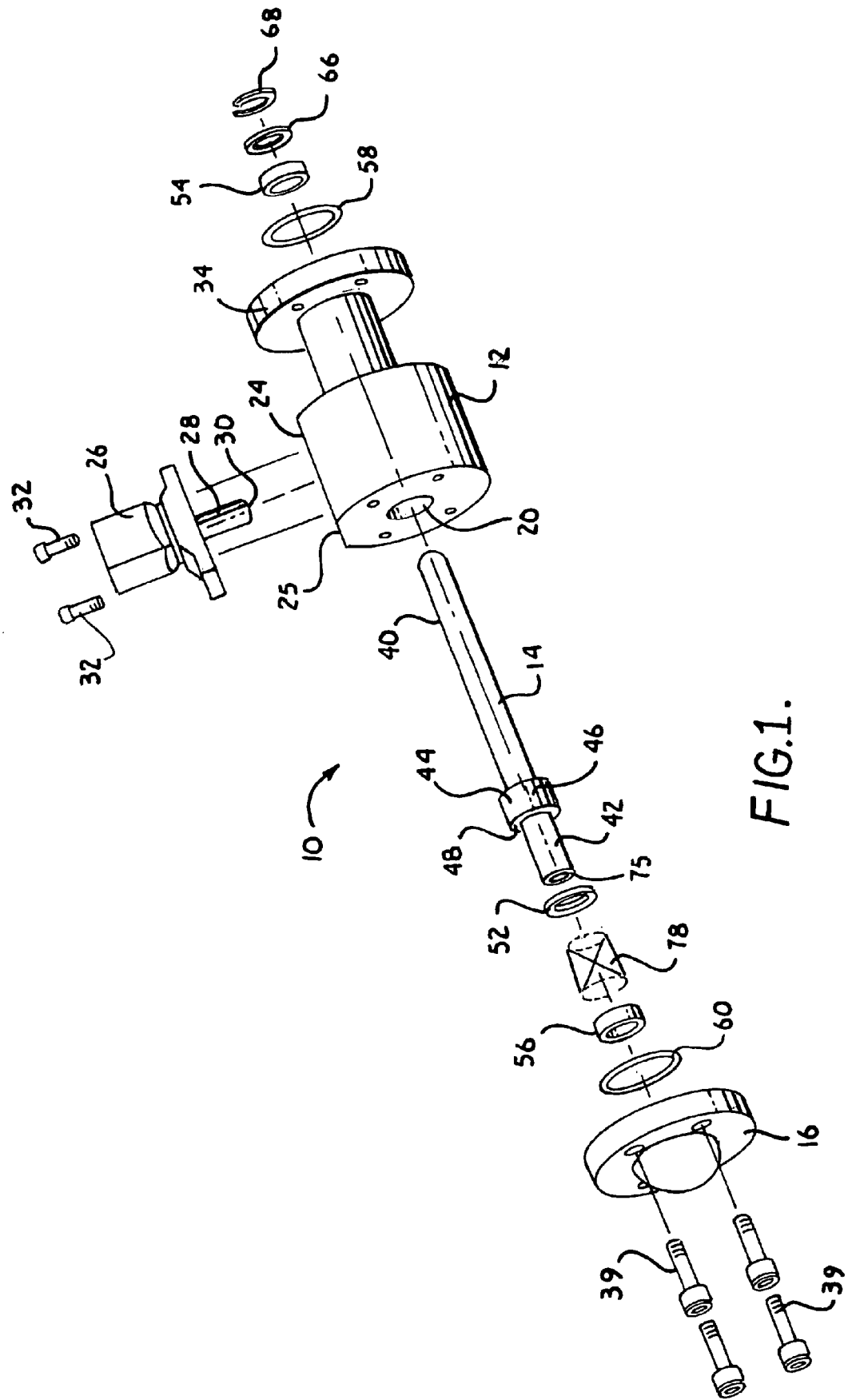
FIG. 1 is an exploded isometric view of a sphere or pig detection switch assembly that embodies the concepts and principles of the present invention.

A sphere or pig detection switch assembly which embodies the concepts and principles of the invention is illustrated in the drawings where a preferred embodiment thereof is identified broadly by the reference numeral 10. The switch assembly 10 may be used for detecting spheres and/or pigs running through a pipe. In particular the assembly 10 may be used to detect when a sphere or pig passes a given point in the pipe and in particular may be used to accurately determine the volumetric flow of a fluid through a pipe. This is accomplished using two switches which are spaced apart a known distance so that the total volume therebetween is also known from the geometry of the pipe. The assembly 10 detects the passage of the sphere and a detection element then simply measures the elapsed time between the passage of the sphere past the two spaced switches. Thus, the volumetric flow rate may be accurately determined.

With reference to FIG. 1, one preferred embodiment of the assembly 10 is shown as including an elongated, hollow, main body portion 12 and an elongated probe shaft 14. The assembly 10 may also desirably include an outer end cap 16.

Figure 4:
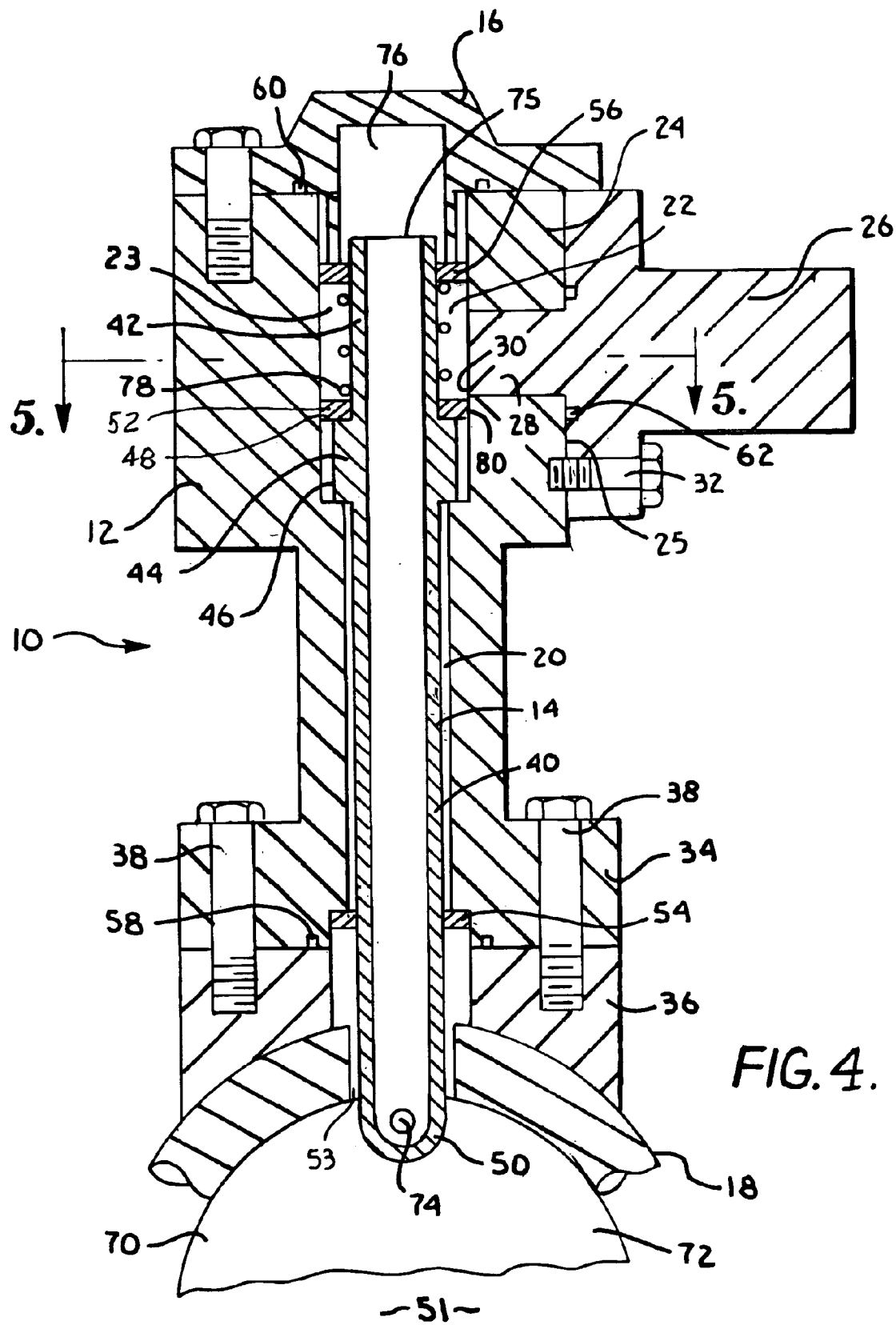
FIG. 4 is a schematic, cross-sectional view of the switch assembly of FIG. 1 mounted in an operational mode on a pipe.

In use, the assembly 10 is desirably mounted on a piece of pipe as shown particularly shown in FIG. 4, where the pipe is identified by the reference numeral 18. The pipe 18 may be a segment of an active pipe or a prover pipe of the sort well known to those of ordinary skill in the detection device art. Suffice it to say, the pipe 18 is one through which a pig or sphere will run.

The main body portion 12 desirably is generally cylindrical as can be seen in FIG. 1, and the same presents therein an elongated hollow chamber 20. With reference to FIG. 4, it can be seen that the body portion 12 also defines a detection zone 22 positioned in a widened portion 23 of the chamber 20. In addition, the body portion 12 includes mounting structure 24 in the preferred form of a flattened surface 25 configured for mounting a detection element 26. The element 26 preferably includes a protruding portion 28 having a detection surface 30 at the distal end thereof. As can be seen from FIG. 4, the surface 30 is located adjacent zone 22 when the detection element 26 is mounted on the body portion 12. As shown in FIG. 4, the element 26 may be attached to the surface 25 using conventional screw means 32.

The body portion 12 further includes a flange 34 which may be attached to a mating flange 36 on pipe 18, once again using conventional screw means 38. Moreover, end cap 16 may be secured to main body portion 12, again using conventional screw means 39. It is also pointed out that the element 26 may be a conventional electronic element of a type well known to the routineers in the pig and sphere detection art. Such devices generate an electrical signal responsive to a disturbance of the magnetic field in a zone such as the zone 22. Also, the mounting structure 24 is conventional and preferably designed and adapted to mount any one of a series of known, commercially available detection elements.

With reference particularly to FIGS. 2 and 3, it can be seen that in the preferred embodiment illustrated in the drawings, the probe shaft 14 may include an inner length 40, an outer length 42 and a centrally disposed activation portion 44. As can be seen viewing FIG. 2, the outer length 42 is disposed on the opposite side of portion 44 from inner length 40. The lengths 40 and 42 are desirably circular in transverse cross-sectional configuration and the activation portion 40 is preferably annular in shape. The outer peripheral edge of the annular activation portion 44 desirably presents a peripheral annular activation surface 46 as can be seen particularly in FIG. 1. The activation portion 44 also includes an annular shoulder 48 which surrounds outer length 42. Probe shaft 14 further has an inner terminal end 50 at the distal end of inner length 40.

As shown in FIG. 4, probe shaft 14 is mainly positioned within chamber 20, and the same is mounted for longitudinal movement therein in a manner described below. As is also shown in FIG. 4, when assembly 10 is mounted on pipe 18, inner terminal end 50 normally protrudes into the interior 51 of the pipe 18 through an access hole 53 provided in pipe 18. It should also be noted that in the preferred form of the invention illustrated in the drawings, the inner end 50 is generally hemispherical in shape.

With reference again to FIGS. 1 and 4, the assembly 10 desirably includes a wiper element 52 and a pair of spaced apart guide bushings 54, 56. Wiper element 52 preferably may be in the form of an annular ring which surrounds outer length 42 and rests on annular shoulder 48. The wiper element may desirably be constructed of a relatively hard plastic material such as, for example, an acetal plastic material. Acetal plastics, which are sometimes known by the trade name Delrin, have many of the same characteristics as industrial metals such as brass, aluminum, zinc, and stainless steel. Particularly valuable properties of acetal plastics include stiffness, good overall mechanical workability, dimensional stability, impact resistance, low moisture absorption, chemical resistance and structural strength. Acetal plastics have replaced many industrial metals in various applications because of their comparable properties and reasonable prices.

Bushings 54, 56 may each preferably be in the form of a non-metallic, rigid annular ring. As shown in FIG. 4, bushing 54 is disposed in surrounding relationship relative to inner length 40 of elongated probe shaft 14, while bushing 56 is disposed in surrounding relationship relative to outer length 42 of elongated probe shaft 14. The bushings 54, 56 may desirably be constructed of a relatively hard, friction resistant plastic material such as, for example, a PFTE plastic material. PFTE plastics, which are sometimes known by the trade name Teflon, have good mechanical, thermal, electrical and water absorption properties. In addition, PFTE plastics have good weather resistance, chemical/solvent resistance and resistance to high temperatures, chemical reaction, corrosion, and stress-cracking. PFTE plastics are also characterized by mechanical toughness and low-friction properties.

Assembly 10 may also include O-rings 58, 60 and 62 which are used in conventional manner to seal the assembly and prevent leakage into the environment, and a washer 66 and snap ring 68 to hold other components in place, also in a conventional manner.

Figure 6:
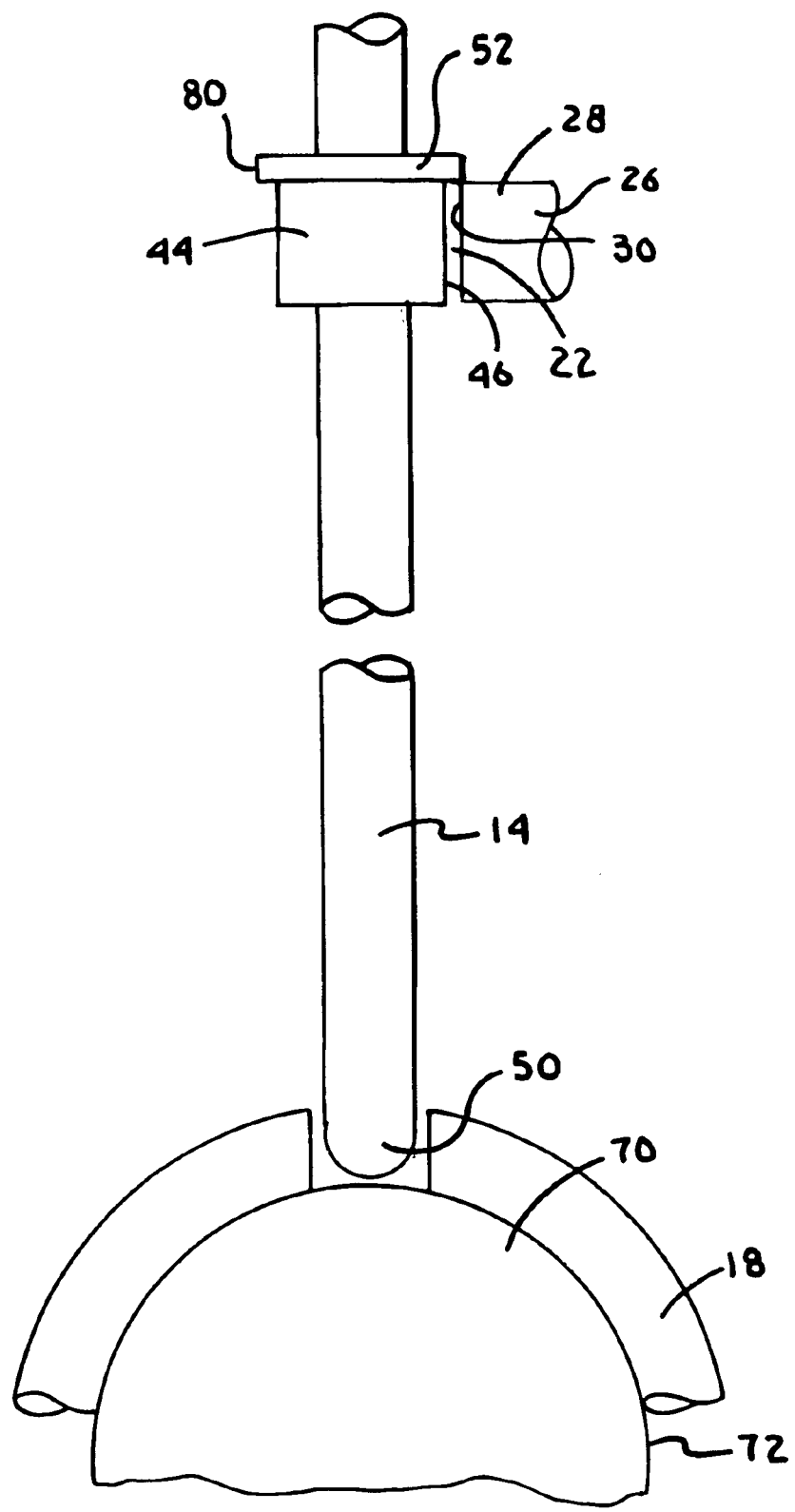
FIG. 6 is a schematic view similar to portions of FIG. 4 but with certain components broken away and with the probe shaft in a different position so as to illustrate the interaction of the end of the probe shaft and a sphere in the pipe and the operation of probe shaft.

When the assembly 10 is assembled, as illustrated in FIG. 4, the probe shaft 14 is mounted for longitudinal movement between a first position (FIG. 4) and a second position (FIG. 6). When the probe shaft 14 is in its first position (FIG. 4), the activation surface 46 is spaced from the detection zone 22. On the other hand, when the probe shaft 14 is in its second position (FIG. 6), the activation surface 46 is at the detection zone 22. The longitudinal movement of the probe shaft 14 is supported and guided by the guide bushings 54, 56. In this regard, the inner and outer lengths 40, 42 of probe shaft 14 are preferably circular in transverse cross-sectional configuration, and the guide bushings 54, 56 have centrally disposed circular holes therein for receiving the respective lengths of the probe shaft 14. Thus, the shaft 14 is supported by guide bushings 54, 56 for longitudinal movement in chamber 20 with no metal-to-metal contact during the movement.

In operation, with the assembly 10 mounted on a pipe 18, as shown in FIG. 4, a sphere 70 moves or run through the pipe. Since the probe shaft 14 is in its first position, the in inner terminal end 50 thereof protrudes into the interior 51 of pipe 18. As illustrated, sphere 70 is disposed beneath the plane of the drawing sheet and the same moves upwardly toward the inner terminal end 50 of the probe shaft 14. When the sphere 70 comes into contact with the end 50, the latter is cammed by the outer surface 72 of the sphere and is pushed upwardly (FIG. 4) toward the chamber 20. When end 50 moves toward chamber 20, probe shaft 14 is moved to its second position (FIG. 6) and activation portion 44 is moved to a position in zone 22 where its presence may be detected by detection element 26. Generally speaking this detection occurs in a conventional manner as a result of the disruption of a magnetic field in zone 22 caused by the presence of activation portion 44 therein. Thus, end 50 of probe shaft 14 is configured, arranged and positioned so as to be contacted by a sphere running along pipe 18 and pushed thereby toward chamber 20.

Probe shaft 14 preferably is hollow presenting an inner passageway 64 and a hole 74 which intercommunicates passageway 64 and the interior of the pipe 18. Also, passageway 64 is open at the end 75 thereof which is remote from the pipe 18 so that passageway 64 also is in intercommunication with a chamber 76 in cap 16. This arrangement causes the pressure in chamber 76 to equalize with the pressure in pipe 18 and permits the probe shaft 14 to move freely between its first and second positions.

Figure 5:
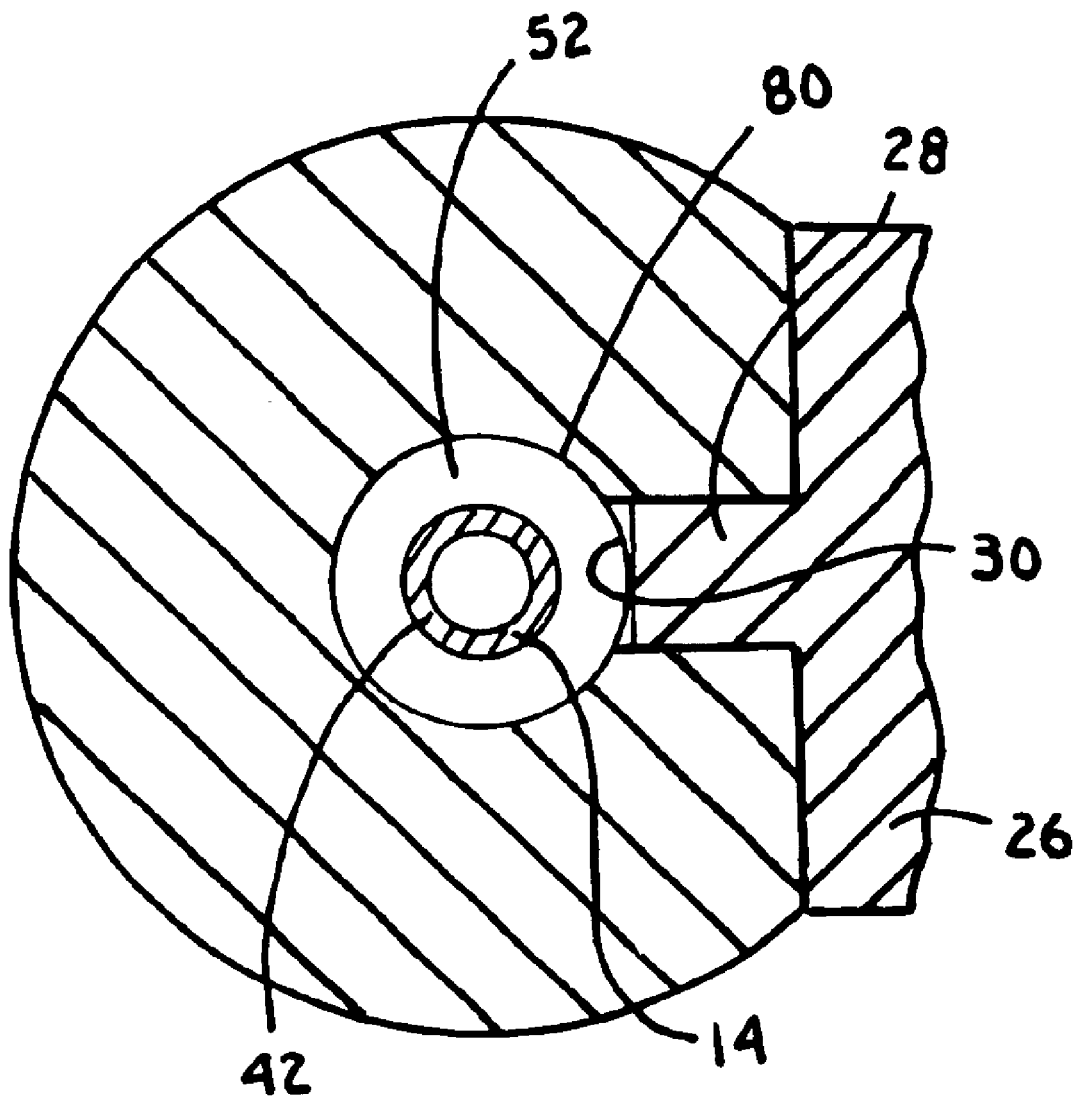
FIG. 5 is a cross-sectional view taken along line 5—5 of FIG. 4.

The wiper element 52 is preferably annular in shape and the same is mounted on outer length 42 of probe shaft 14 as mentioned above. Also, wiper element 52 rests on shoulder 48. A coil spring 78 is provided to act between bushing 56 and element 52 to urge the latter into secure contact with shoulder 48. Thus, wiper element 52 is carried by probe shaft 14 as the latter moves from its first position to its second position. The outer peripheral edge 80 of the wiper element 52 is preferably annular in shape and the detection surface 30 of the detection element 26 is preferably generally flat as illustrated in FIG. 5. The edge 80 desirably passes within about 0.005 inch of the center of surface 30, this being sufficiently close to remove any debris which might otherwise interfere with the operation of the detection element. Thus, the element 52, and in particular the peripheral edge 80 thereof, are positioned to wipe the surface 30 free of debris as the probe shaft 14 moves from its first position to its second position under the influence of the contact between the surface 72 of the sphere 70 and the inner end 50 of probe shaft 14. In particular the element 52 is in a position to wipe the surface 30 free of any metallic debris which might otherwise interfere with the ability of the detection element 26 to detect the presence of the activation portion 44 and the activation surface 46 thereof in the zone 22.

With reference to FIG. 5, the edge 80 and the surface 30 appear to be in direct contact. This is not necessary in accordance with the invention, and in actual practice, as explained above, it is desirable for there to be a slight gap between edge 80 and surface 30. In accordance with the concepts of the invention this gap may vary from as much as about 0.007 inch to as little as about 0.003 inch. Furthermore, with reference to guide bushings 54, 56, for an inner or outer length 40, 42 having an outer diameter of approximately 0.648 inch, the gap between the inner surface of each guide bushing and the outer surface of the respective length should desirably be approximately 0.011 to 0.015 inch for warm weather installations and approximately 0.022 to 0.015 inch for cold weather installations where shrinkage is likely to be encountered. Suffice to say that the length of the probe shaft 14 may vary from installation to installation.

I claim:

1. A sphere or pig detection switch assembly adapted for being mounted on a pipe through which the sphere or pig will run, said detection switch assembly comprising;

An elongated, hollow main body portion presenting an elongated chamber therein, said body portion defining a detection zone positioned in said chamber and including mounting structure for a detection element including a detection surface to be mounted adjacent said zone;

an elongated probe shaft disposed mainly within said chamber, said probe shaft including a centrally disposed activation portion, said probe shaft being longitudinally moveable within said chamber from a first position with said activation portion spaced from said zone to a second position with said activation portion at said zone, said probe shaft including an inner terminal end that protrudes into a pipe upon which the detection switch assembly is mounted when the probe shaft is in its first position, said inner terminal end being configured, arranged and positioned so that it will be contacted and pushed toward said chamber by a pig or sphere running along a pipe upon which the switch assembly is mounted, whereby to cause said probe shaft to move from said first position to said second position; and a wiper element carried by the probe shaft in a position to wipe debris from a detection surface positioned adjacent said zone as the probe shaft moves from said first position to said second position under the influence of contact between a pig or sphere and said inner terminal end of the probe shaft.

2. A sphere or pig detection switch assembly adapted for being mounted on a pipe through which the sphere or pig will run, said detection switch assembly comprising;

An elongated, hollow main body portion presenting an elongated chamber therein, said body portion defining a detection zone positioned in said chamber and including mounting structure for a detection element including a detection surface to be mounted adjacent said zone;

an elongated probe shaft disposed mainly within said chamber, said probe shaft including a centrally disposed activation portion, said probe shaft being longitudinally moveable within said chamber from a first position with said activation portion spaced from said zone to a second position with said activation portion at said zone, said probe shaft including an inner length including an inner terminal end that protrudes into a pipe upon which the detection switch assembly is mounted when the probe shaft is in its first position, said inner terminal end being configured, arranged and positioned so that it will be contacted and pushed toward said chamber by a pig or sphere running along a pipe upon which the switch assembly is mounted, whereby to cause said probe shaft to move from said first position to said second position, said probe shaft further including an outer length disposed on an opposite side of said activation portion from said inner length; and a pair of non-metallic, rigid guide bushings, one of said guide bushings being disposed in generally surrounding relationship to said inner length of said probe shaft and another one of said guide bushings being disposed in generally surrounding relationship to said outer length of said probe shaft, whereby to support and guide said probe shaft as it moves longitudinally from said first position to said second position and avoid any metal-to-metal contact during such movement.

3. A sphere or pig detection switch assembly as set forth in claim 2, and a wiper element carried by the probe shaft in a position to wipe a detection surface positioned adjacent said zone as the probe shaft moves from said first position to said second position under the influence of contact between a pig or sphere and said inner terminal end of the probe shaft.

4. A sphere or pig detection switch assembly as set forth in claims 1, 2 or 3, wherein said chamber is cylindrical.

5. A sphere or pig detection switch assembly as set forth in claim 4, wherein said activation portion is annular.

6. A sphere or pig detection switch assembly as set forth in claim 1 or 3, wherein said activation portion is annular.

7. A sphere or pig detection switch assembly as set forth in claim 6, wherein said wiper element is annular, surrounds said outer length of said probe shaft and contacts an annular shoulder of said activation portion.

8. A sphere or pig detection switch assembly as set forth in claim 7, wherein said detection surface is generally flat and said wiper element has an outer peripheral edge which is at a distance of from about 0.003 to about 0.007 inch from said detection surface as it passes thereby.

9. A sphere or pig detection switch assembly as set forth in claim 7, wherein said wiper element is made of an acetal plastic.

10. A sphere or pig detection switch assembly as set forth in claim 2 or 3, wherein each said bushing includes an inner circular hole and said inner and outer lengths of the probe shaft are circular in transverse cross-sectional configuration.

11. A sphere or pig detection switch assembly as set forth in claim 10, wherein said bushings are made of a PFTE plastic.

12. A sphere or pig detection switch assembly as set forth in claim 7, wherein said wiper element and said detection surface are positioned such that the latter is wiped free of any debris which might otherwise be present on said surface in sufficient quantity to interfere with the detection of the presence of the said activation portion at said detection zone when the peripheral edge passes said surface during movement of the probe shaft from said first position to said second position.

13. A sphere or pig detection switch assembly as set forth in claim 7, wherein is included a spring urging said wiper element against said shoulder.

\* \* \* \* \*